United States Patent [19]

Boyd

[11] 3,964,422

[45] June 22, 1976

[54] MARINE FENDER

[76] Inventor: Harold B. Boyd, 9771 Via Zibello, Burbank, Calif. 91504

[22] Filed: Sept. 18, 1975

[21] Appl. No.: 614,483

[52] U.S. Cl. .............................................. 114/219
[51] Int. Cl.² ........................................ B63B 59/02
[58] Field of Search ................... 114/219, 220; 9/8; 276/140

[56] References Cited
UNITED STATES PATENTS

| | | | |
|---|---|---|---|
| 1,877,793 | 9/1932 | Beynon | 114/219 |
| 2,903,990 | 9/1959 | Brown | 114/219 |
| 3,455,269 | 7/1969 | Dean | 114/219 |
| 3,553,749 | 1/1971 | Maseske | 267/146 |
| 3,863,591 | 2/1975 | Wild | 114/219 |

*Primary Examiner*—Trygve M. Blix
*Assistant Examiner*—Gregory W. O'Connor
*Attorney, Agent, or Firm*—Roger A. Marrs

[57] ABSTRACT

A fender for boats or the like is disclosed herein having an inner core filled with a resilient foam material of a given density or compressibility and an outer shell having its wall coextensive with the inner core so as to define an outer chamber occupied with a second resilient foam material of a lesser density or compressibility than the material captured within the inner core. The inner core and outer shell are integrally formed to provide a single unitary construction and end swivels are carried on the opposite ends of the fender for evenly distributing of applied loads.

9 Claims, 3 Drawing Figures

MARINE FENDER

BACKGROUND OF THE INVENTION

1. Field of the Invention

This invention relates, in general, to a bouyant marine fender commonly used as a protection for boats, docks, piers or the like and more particularly to a novel marine fender of integral, unitary construction capable of distributing loads into the swiveled mooring line.

2. Background of the Prior Art

In the past, it has been the conventional practice to employ resilient fenders for ships, piers or docks. As an example, as vessels approach a pier or dock, there is nearly always a substantial impact, and often receiving the impact between the ship's hull and pier or dock, it is the usual practice to provide a fender or fenders on the ship or dock, or both. Previous fenders were commonly made of rolled or coiled mat and other natural hard fiber material. These types of fenders have low compressional resilience, high water absorption and low rot resistance and hence are not suitably effective or satisfactory for fending large vessels under repeated impacts.

Another prior fending device is of the pneumatic kind and wherein the compressional resiliency may be adjusted by inflating or deflating the fender. Although the resiliency can be adjusted, this type of fender is of a single shock absorbing stage resiliency and cannot automatically take into account various impacts or varying loads applied to the fender. Furthermore, none of the aforementioned fenders adequately distribute applied load forces into the mooring line or the line securing the fender to the ship or dock. Therefore, the full absorption of loads and shocks is experienced by the fender itself.

Therefore, a long standing need exists for providing a fender which is integral in its construction, adapted to relate to varying loads and degrees of compressional resiliency and which is capable of transferring impact loads to its supporting line.

SUMMARY OF THE INVENTION

Accordingly, the above problems and difficulties are obviated by the present invention which provides a novel marine fender having an inner core which captures or houses a resilient foam material of a given density or compressibility. An outer shell is integrally formed with the inner core so as to find an outer chamber which is occupied by a second foam material of lesser density or compressibility than the first mentioned material. Thus, a two-phase shock absorbing fender is produced. Swivel means are carried on a securement or mooring line which is capable of transferring impact loads from the fender into the mooring anchor or other securement medium.

Therefore, it is among the primary objects of the present invention to provide a novel marine fender which is integral construction so as to provide a single one-piece structure and yet which includes two-stage shock absorption characteristics.

Another object of the present invention is to provide a novel marine fender which includes an inner and outer compartment filled with resilient foam of different densities so as to provide two-stage shock absorption characteristics and which includes means for distributing impact loads into securement lines.

Still another object of the present invention is to provide a novel buoyant marine fender which is integrally constructed to provide a single unitary structure having compartments filled with foam of different densities.

Still a further object of the present invention is to provide an improved marine fender for use between vessels and between vessels and docks or piers which will have high compressional resiliency, low water absorption and high rot resistance. Such a fender will successfully withstand repeated heavy impacts without material damage and will provide adequate protection against impact damage to ship and dock for long periods of use without collapsing.

A further object resides in providing a marine fender having high resistance to puncture and damage due to abrasion.

Another object resides in providing a marine fender which is buoyant and which will not sink even if outer shell is broken.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF THE PREFERRED EMBODIMENT

Figure 1:
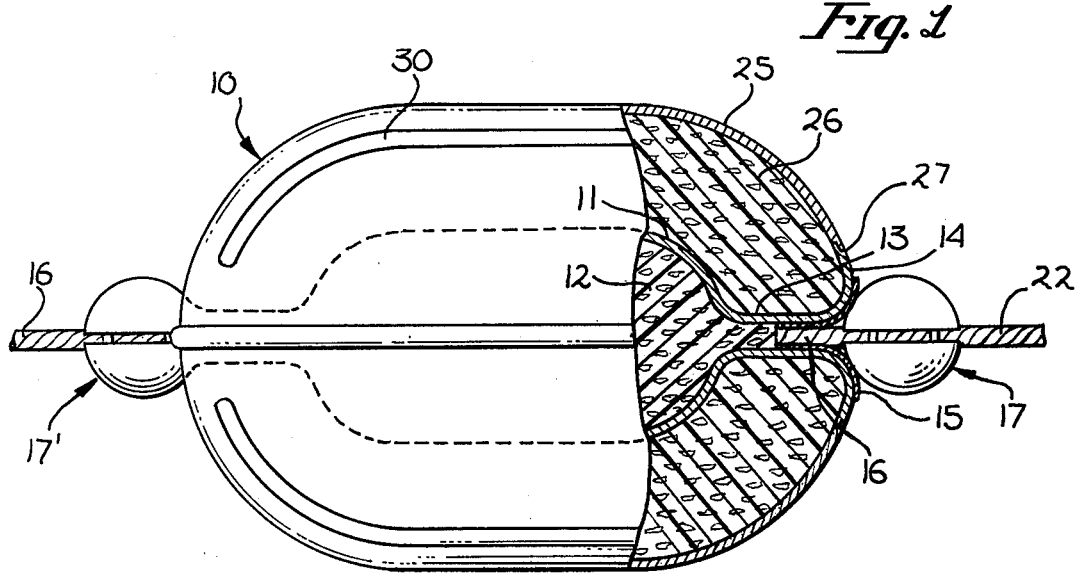
FIG. 1 is a side elevational view of the novel marine fender of the present invention having a portion thereof broken away to expose the internal chambers defined therein.

Referring to FIG. 1, the novel marine fender of the present invention is indicated in the general direction of arrow 10 and it can be seen that the fender includes an inner core or shell 11 filled with the foam material via the opening defined by an elongated neck 13 and the interior chamber of the core is open ended so that chamber may be filled with the foam material from either end. An anti-friction liner 15 is positioned at the entrance to the opposite ends of the chamber adjacent the flared-out portions 14 and the liner include an opening through which a cable or mooring or securement rope is passed. The rope is indicated by numeral 16 and terminates in a swivel construction indicated by numeral 17 in FIG. 3.

Figure 3:
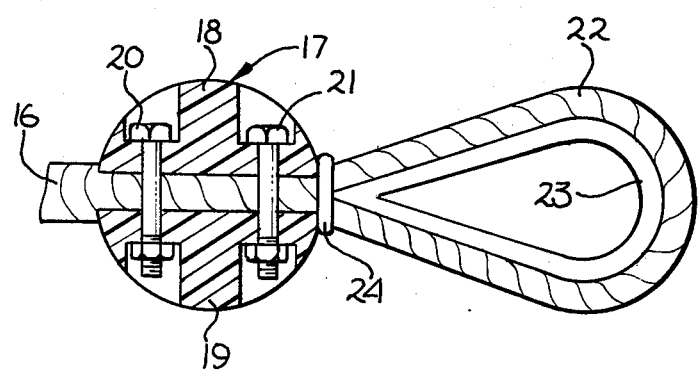
FIG. 3 is a view of the swivel means carried at the opposite ends of the marine fender shown in FIG. 1.

With respect to FIG. 3, it can be seen that the swivel includes a pair of clamped portions or elements 18 and 19 that are held together by at least four machine bolt and nut sets such as is indicated by numerals 20 and 21 associated with one side of the swivel. The swivel is intentionally employed to capture the end of the rope 16 so that an eyelet 22 is formed in the end thereof. Preferably, the eyelet is formed about a thimble 23 and a suitable retainer or washer 24 is provided where the rope is doubled over forming the eyelet.

Construction of the swivel and core in the above described manner provides a suitable bearing surface for the swivel against the anti-friction liner 15 so that the fender may readily rotate or move about the portion of the rope 16 on which the fender is carried.

Figure 2:
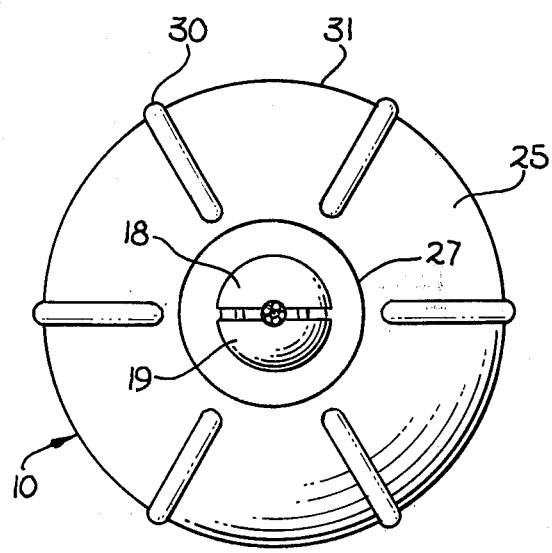
FIG. 2 is an end elevational view of the novel marine fender shown in FIG. 1.

Referring now in detail to FIGS. 1 and 2, it can be seen that flared-out portion 14 of the inner core 11 is mated with the ends of an outer shell 25 along a circular seam line 27. A chamber is provided between the exterior surface of the core 11 and the interior surface of the shell 25 which is occupied by a second plastic foam material identified in general by the numeral 26. It is a critical limitation of the present invention to understand that the foam filler material 12 and the foam filler material 26 are of different densities so that a two-stage shock absorbing device is provided. For example, the foam filler is machined poured into the respective chambers of the fender and the end result is a combined filler system with two different densities and degrees of compressibility. The filler 12 in the core 11 is preferably of denser characteristics than the filler 26 in the chamber defined by the inner wall surface of the shell 25. It is also important to understand that the foam or filler material in each of the respective chambers are coaxially disposed with respect to each other as well as a coaxial relationship between the core 11 and outer shell 25. By this arrangement, the material in the outer chamber will compress immediately before compression of the filler material 12 in the core 11. Thus, a two-stage shock absorbing arrangement is provided which is balanced because of the coaxial relationship.

In view of the foregoing, it can be seen that the novel marine fender of the present invention provides an outer shell 25 constructed of a highly abrasive resistant material and that preferably, the core 11 is pre-molded of high impact plastic material. During the molding process, the inner core is formed, then the shell is rotationally molded and bonded to the preformed inner core. The inner section or core is filled with foam, such as a closed cell chemically blown type. Then the outer cavity is foam filled in the same manner. The bond between the inner core and the foam and the outer shell and the foam is good, has high integrity and the entire mass is integral at the finish. This procedure securely bonds all of the component parts together into an integral unitary structure. The foam filler may also be machined poured, if desired, and the result is a filler with two different densities and degrees of compressibility. Also, it is to be kept in mind that different foam materials can be employed such as an opened cell material in one compartment or chamber and a closed cell filler material in the other chamber or compartment. It can also be seen that all of the components, that is the core, filler material and the shell are bonded during the manufacturing process into a single mass so that there is no separation between any of the components. The respective swivels 17 which clamp the mooring line 16, act as swivels and disperse the applied load over the mass of the fender. This construction is opposed to the prior mooring systems employing fenders where eyelets or flaps with grommets are inserted into each end of the fender. In these prior instances, the load is directly applied to the flap or the eyelet at the end which results in tearing or damage. In the present invention, the applied loads are transferred via the balls or swivels 17 at the opposite ends of the fender so as to be absorbed by the whole mass of the fender instead of just at the opposite ends. Furthermore, the material used in the construction results in completely corrosion proof performance and since all materials are integral to each other, such damage as puncturing, tearing or the like does not adversely effect the fender. The fender cannot deflate and cannot sink since all of the components are bonded into one integral construction.

Also, a plurality identified ribs, such as ientified by numeral 30, are integrally formed on the exterior surface of the shell 25 so that swell action of the water environment will not roll the fender out of place. Flat surfaces are provided between adjacent ribs and are represented by the flat surface indicated by numeral 31 in FIG. 2.

In view of the foregoing, it can be seen that the marine fender of the present invention provides a novel two-stage shock absorbing device for protecting boats, piers, docks, or the like. The compressibility or resiliency of the fender is in balance due to the coaxial relationship with respect to the core and outer shell so that coaxial chambers are provided for holding materials of different densities and compressibility. Also, materials may also be used which differ in construction so that closed and opened celled materials may be employed in a differential manner with respect to the chambers. Therefore, the characteristics of the filler material can differ not only in density but in whether or not the material is opened or closed cells.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:
1. A marine fender comprising the combination of:
an inner core having open-opposite ends leading into a first chamber defined by the inner wall surface of said core;
each of said open opposite ends of said core provided with an integral outwardly flared portion terminating in a circular edge;
an outer shell coaxially disposed with respect to said inner core having circular opposite ends joined to said flared portions circular edges respectively so as to provide an integral joint therewith;
said outer shell and said inner core defining a second chamber coaxially disposed with said first chamber and defined between the opposing wall surfaces of said inner core and said outer shell respectively;
a first plastic foam filler material of a given density occupying said first chamber and a second plastic foam filler material of a density less than said given density of said first foam filler material occupying said second chamber; and
swivel means carried on a rope passing through said core at opposite ends of said fender.
2. The invention as defined in claim 1 including a frusto-conically shaped liner carried at each end of inner core and disposed between said swivel means and said flared portion.
3. The invention as defined in claim 2 wherein said swivel means includes a ball shaped element comprising a pair of clamp pieces joined together by bolt and nut sets.
4. The invention as defined in claim 3 wherein said core includes an integrally formed neck interconnecting said core with said flared portion at the respective opposite ends of said fender.

5. The invention as defined in claim 4 wherein said foam filler material is a closed cell plastic composition.

6. The invention as defined in claim 5 wherein said first and second foam filler materials provide a two stage shock absorbing structure wherein said second filler material compresses before said first filler material.

7. The invention as defined in claim 6 wherein said swivel means translate applied impact loads to said fender into said rope.

8. The invention as defined in claim 7 wherein said outer shell includes a plurality of ribs integrally formed on the exterior surface thereof so as to outwardly project to provide a radial pattern in end view.

9. The invention as defined in claim 8 wherein said core, said shell and said filler materials are bonded into a single unitary construction.

* * * * *